United States Patent
Covely

(10) Patent No.: US 9,538,710 B2
(45) Date of Patent: Jan. 10, 2017

(54) CROP PRODUCT TRACKING SYSTEM AND METHOD

(71) Applicant: Agri-Labs Holdings LLC, Auburn, IN (US)

(72) Inventor: Tony W Covely, Corunna, IN (US)

(73) Assignee: Tony Wayne Covely, Auburn, IN (US)

( * ) Notice: Subject to any disclaimer, the term of this patent is extended or adjusted under 35 U.S.C. 154(b) by 143 days.

(21) Appl. No.: 14/467,965

(22) Filed: Aug. 25, 2014

(65) Prior Publication Data
US 2014/0365083 A1    Dec. 11, 2014

Related U.S. Application Data

(63) Continuation-in-part of application No. 13/633,991, filed on Oct. 3, 2012, and a continuation of application
(Continued)

(51) Int. Cl.
*A01G 1/00* (2006.01)
*G06F 17/30* (2006.01)
*E02D 1/04* (2006.01)

(52) U.S. Cl.
CPC .............. *A01G 1/001* (2013.01); *E02D 1/04* (2013.01); *G06F 17/30979* (2013.01); *G06F 17/30991* (2013.01)

(58) Field of Classification Search
CPC .............. E02D 1/04; G06F 17/30979; G06F 17/30991; A01G 1/001
(Continued)

(56) References Cited

U.S. PATENT DOCUMENTS 4,356,734 A * 11/1982 Ivancsics ............... G01N 1/04
                                                         172/438
4,869,115 A *  9/1989 Edwards ............... G01N 1/04
                                                         172/112
(Continued)

FOREIGN PATENT DOCUMENTS

| CA | 2526883    |   | 6/2007  |
|----|------------|---|---------|
| CA | 2529883    | † | 6/2007  |
| CN | 201689442 U| * | 12/2010 |

OTHER PUBLICATIONS

AgFleet Helpdesk, How to Mark Target Samples, 2007.
(Continued)

*Primary Examiner* — Carol S Tsai
(74) *Attorney, Agent, or Firm* — Indiano & McConnell LLC

(57) ABSTRACT

A system is disclosed that can be used in precision farming to apply crop product to a field. The system includes a remote terminal connected with a network. The remote terminal includes a scanning application configured to allow the remote terminal to scan a unique product identifier associated with a crop product to be applied to a field. A server is connected with the remote terminal via the network. A transmission application is associated with the remote terminal that is configured to transmit the unique product identifier to the server. A lookup application associated with the server is configured to query a crop product database to retrieve one or more crop product data properties associated with the crop product. A prescription map generation application is configured to generate a prescription map for the field as a function of the one or more crop product data properties. A map transmission application is configured to transmit the prescription map to a field terminal associated with a piece of farming equipment which
(Continued)

applies the crop product to the field according to the prescription map.

21 Claims, 16 Drawing Sheets

Related U.S. Application Data

No. 12/752,269, filed on Apr. 1, 2010, now Pat. No. 8,286,857.

(58) Field of Classification Search
USPC .......... 702/2, 5; 705/7.13; 701/50; 235/375, 235/462.15, 472.01, 487; 73/864.41, 864.45, 73/864.52, 864.31; 382/159, 141
See application file for complete search history.

(56) References Cited

U.S. PATENT DOCUMENTS

| | | | | |
|---|---|---|---|---|
| 5,394,949 | A * | 3/1995 | Wright | E21B 7/006 175/121 |
| 5,435,399 | A * | 7/1995 | Peterson | E02D 1/04 175/135 |
| 5,591,974 | A † | 1/1997 | Troyer | |
| 5,741,983 | A * | 4/1998 | Skotnikov | A01B 79/005 175/20 |
| 5,991,687 | A † | 11/1999 | Hale | |
| 6,016,713 | A | 1/2000 | Hale | |
| 6,044,324 | A * | 3/2000 | Boerhave | E02D 1/00 702/5 |
| 6,119,531 | A * | 9/2000 | Wendte | A01B 79/005 702/2 |
| 6,947,866 | B2 | 9/2005 | Staab | |
| 6,963,881 | B2 | 11/2005 | Pickett et al. | |
| 7,113,922 | B2 † | 9/2006 | Fowler | |
| 7,216,555 | B2 * | 5/2007 | Drummond | A01B 79/005 73/864.45 |
| 7,255,016 | B2 * | 8/2007 | Burton | E02D 1/04 173/19 |
| 7,552,654 | B2 * | 6/2009 | Burton | E02D 1/04 173/19 |
| 8,286,857 | B2 * | 10/2012 | Covely | E02D 1/04 235/375 |
| 8,613,234 | B1 * | 12/2013 | Harrell | G01N 1/08 172/22 |
| 8,726,407 | B2 * | 5/2014 | Etchegoyen | G06F 21/57 713/176 |
| 9,116,078 | B1 * | 8/2015 | Scheiderer | G01N 1/04 |
| 9,213,905 | B2 * | 12/2015 | Lange | G06K 9/00805 |
| 2002/0035431 | A1 * | 3/2002 | Ell | A01B 79/005 702/5 |
| 2002/0091593 | A1 | 7/2002 | Fowler | |
| 2005/0172733 | A1 * | 8/2005 | Drummond | A01B 79/005 73/864.41 |
| 2005/0197175 | A1 † | 9/2005 | Anderson | |
| 2006/0106539 | A1 † | 5/2006 | Choate | |
| 2007/0075141 | A1 | 4/2007 | Veitch et al. | |
| 2008/0085506 | A1 | 4/2008 | Bjorndal et al. | |
| 2008/0229805 | A1 | 9/2008 | Barket et al. | |
| 2009/0057422 | A1 | 3/2009 | Dugas et al. | |
| 2009/0198541 | A1 | 8/2009 | Dolan et al. | |
| 2011/0093703 | A1 * | 4/2011 | Etchegoyen | G06F 21/57 713/168 |
| 2011/0240730 | A1 * | 10/2011 | Covely | E02D 1/04 235/375 |
| 2012/0237083 | A1 * | 9/2012 | Lange | G06K 9/00805 382/103 |

OTHER PUBLICATIONS

AgFleet Overview 2008, Product Outputs, 2008.
AgFleet, Field Sampler Product Outputs, 2008.
AgFleet, ZedX Innovations for Decision Making, 2007.
AgFLeet-Field Sampler, ZedX Inc, 2008.
AgGPS 160 Portable Computer, Support Note, Connecting Equipment to the AgGPS 160 Portable Computer, Nov. 2001.
AgGPS Field Manager Quick Reference Card, 2002.
David Hest, Online crop control—Web-based software allows easy access to crop data farmindustriesnews.com, Aug. 2009.
Farm Site Website printout, May 25, 2007.
Farm Trac, Field record-keeping software article, Feb. 26, 2008.
FarmLogic Overveiw, A Simple Farm Information Management System Has Arrived. Finally!, Sep. 22, 2008.
Hui Fang, Yong He, A Pocket PC based field information fast collection system, Received Aug. 30, 2004.
R. Scott Nusbaum-Farm Works Software, Site Mobile and Farm Works Software, Jun. 18, 1999.
R.D. Buick, Precision Agriculture: An Integration of Information Technologies With Farming, 1997.
TDS Nomad, Website Printout, Sep. 21, 2008.
Trimble AgGPS 170 Field Computer User Guide, Mar. 2001.
Trimble Agriculture Product Bulletin, EZ-View and EZ-Office Software: 2010 Software Editions Now Available, Nov. 19, 2009.
Trimble EZ-Office Mobile Software and the Trimble Nomad Handheld Computer, Nov. 2009.
Trimble Nomad Handheld Computer Getting Started Guide, Oct. 14, 2008.
Trimble News Press Release, Trimble Adds Portable Computer to AgGPS Product Line, May 18, 2001.
Trimble Nomad Handheld Computer Datasheet, Nov. 2008.
Trimble Nomad, Information Management Solutions—Website Printout, 2009.
Trimble Press Release, Trimble Acquires Farm Works Software Assets to Explain its Precision Agriculture Solutions, Jul. 17, 2009.
Trimble Press Release, Trimble Expands EZ-Office Agriculture Software Capabilities for Field and Office, Nov. 20, 2009.
Trimble Press Release, Trimble Introduces New Nomad 800X Series Rugged Handhelds, Jan. 7, 2009.
Trimble press release, Trimble Introduces Nomad Rugged Handheld Computer with 806 MHz Processor VGA Display, Integrated GPS, Wireless and Optical Capabilities, Jul. 17, 2007.
Trimble Press Release, Trimble Nomad Rugged Handheld Computers with Digital Camera and Bar Code Scanner Now Available, Nov. 5, 2007.
Trimble, News Press Release, Trimble Continues to Add Value to Precision Farming, Feb. 11, 1999.
Trimble, Technical Notes, AgGPS 170 Field Computer, Rugged Field Computer for Precision Agriculture, 2002.
S.G. Borgelt, J.D. Harrison, K.A. Sudduth, S.J. Birrell. Evaluation of GPS for Application in Precision Agriculture. Applied Engineering in Agriculture. American Society of Agricultural Engineers. vol. 12(6), pp. 633-638.
George B. Frisvold. Data, Information, and Rural Environmental Policy: What Will the Next Ten Years Bring? Review of Agricultural Economics, Oxford University Press. vol. 22, No. 1 (Spring-Summer 2000), pp. 237-244.
Cecil H. Yancy, Jr. Date on tap. Mid-South Farmer. Jan. 2009, p. 1.
Farm Works Software. Barcode reader for soil samples with Site Mate. Search Discussion Boards. Nov. 2, 2009.
www.youtube.com/watch?v+MOhhCpalOta. Data hand held collecitons in the field. Uploaded Sep. 3, 2008.
Programmers Stack Exchange. http://programmers.stackexchange.com/questions/95589/boss-doesnt-believe-my-time-estimate-advice-backup. Dealing with bad/incomplete/unclear specifiations? Sep. 25, 2009.
Cecil H. Yancy, Jr. Data on Tap, Mid-South Farmer, Jan. 2009.†
http://farmworks.com/forum/read.php?10,58037 Website Forum publication Nov. 2, 2009.†
http://programmers.stackexchange.com/questions/95589/boss-doesnt-believe-my-time-estimate-advice-backup Matt G. Website forum Sep. 25, 2009.†
https://www.youtube.com/watch?v=MOhhCpalOtA Video for Trimble Nomad uploaded Sep. 3, 2008.†

\* cited by examiner
† cited by third party

CROP PRODUCT TRACKING SYSTEM AND METHOD

CROSS REFERENCE TO RELATED APPLICATIONS

The present application is a continuation-in-part of and claims the benefit of U.S. application Ser. No. 13/633,991 filed on Oct. 3, 2012, which is a continuation of U.S. application Ser. No. 12/752,269 filed on Apr. 1, 2010, and now U.S. Pat. No. 8,286,857.

BACKGROUND

The present invention relates generally to soil sampling and more particularly, to a system and method of soil sampling to determine the nutrient level of soil in fields so that a variable-rate nutrient pattern or prescription can be generated for a particular field.

The present invention also relates generally to a system and method for tracking farm product applied to a field and generating prescription maps based on a unique identifier scanned from a container containing the farm product.

The present invention also relates to a system and method in which soil samples can be ordered through work orders issued by various farming companies across vast geographic areas, processed, tracked, and results reported back to the farming companies for further processing and use.

The agricultural industry uses soil samples to determine the nutrient level of soil in fields. Soil sampling and testing provides an estimate of the capacity of the soil to supply adequate nutrients to meet the needs of growing crops. In some instances, the test results are compared to standard response data associated with specific types of crops to estimate the need to supply additional nutrients for optimum crop production. The test results are then used as a basis for profitable and environmentally responsible fertilizer application.

Typically, about a teaspoonful of soil is actually used for laboratory analysis. That small amount represents the entire area for which the fertilizer recommendation is made for that particular area. Several soil samples are typically taken from a given field and represent an area of the field. The soil samples are often taken using different soil sampling pattern options. A grid pattern is usually the best way to ensure that the entire field is represented. In this form, a given field is divided up into various cells with each cell representing an area of the field. For illustrative purposes only, a sixty acre field could be divided up into thirty cells with each cell representing two acres of the field. A sample is taken from each cell to generate a representative nutrient map of the field.

Currently, most soil samplers use a computer to guide them to the correct location of the field from which samples are taken. The soil samplers use a probe to take the soil sample and the soil is then placed in a container which is sent to a lab for soil analysis. The soil samplers must have some way of identifying one container from another. One way to do this is to handwrite specific information on each container. For example, each container may have handwritten material placed on them identifying a client name, farm name, field name and a sample identification. This method is very time consuming and can be filled with errors at the lab by misreading the written information.

A second way is to print labels ahead of time in the office and take them out to the field when gathering samples. After each soil probe, the soil sampler applies a label to the container, thereby distinguishing it from other containers. This method is also problematic because of the tendency to put the wrong label on the container and it is also time consuming. When the soil sampler is done collecting the samples they are shipped off to the lab where the samples can be processed and fertilizer recommendations can be made. Both of the above-described techniques for container identification are very time consuming for lab technicians as well as the soil samplers. Receiving containers with either handwritten information or printed labels causes the lab technicians to have to re-enter this information into a computer at the lab. This is also another area in which mistakes are easily made thereby causing samples to fail to get matched up with the right information. Once the samples are processed or analyzed at the lab, the test results are sent to the customer who may then import that data into a software application for processing of application maps for fertilizer or other farming operations.

If a farming company wants to obtain a soil sample, typically a call is placed to a soil sampling company and an order is placed over the phone. The soil sampling company will then take the samples and send the samples to a laboratory. This process can take some time and generally requires the soil sampling company to maintain an office in the general geographic location in which the field is located. As such, a need exists for a system in which a soil sampling company can be located in one location yet service farm companies or farmers across an entire country or region.

Currently, in the agriculture industry, a farmer that wants to record what type of seed gets planted or what type of chemical gets applied to a field has to enter the information about the particular seeds or chemicals manually into a field computer. The field computer is programmed to prompt the farmer to enter information about the product being planted or applied and then the farmer can either type that information in or select a product from a drop down menu or list that appears on the field computer. If the farmer switches to a different seed, or chemical, and continues operation, the field computer will continue to record as if it is the previous seed or chemical resulting in bad data. Sometimes, if the name of the product is manually entered, the name gets entered wrong or the wrong product can get selected from the dropdown menu or list.

Also, currently systems available today require that a predetermined application map be made ahead of time and loaded into the field computer at some point in the process. If the application map is not available, the farmer has to stop and wait for the application map or applies the product without the map. As such, a need exists for farmers to be able to plant crop or apply chemicals "on the fly" without the need to wait for application maps.

DESCRIPTION OF ILLUSTRATIVE EMBODIMENTS

Figure 1:
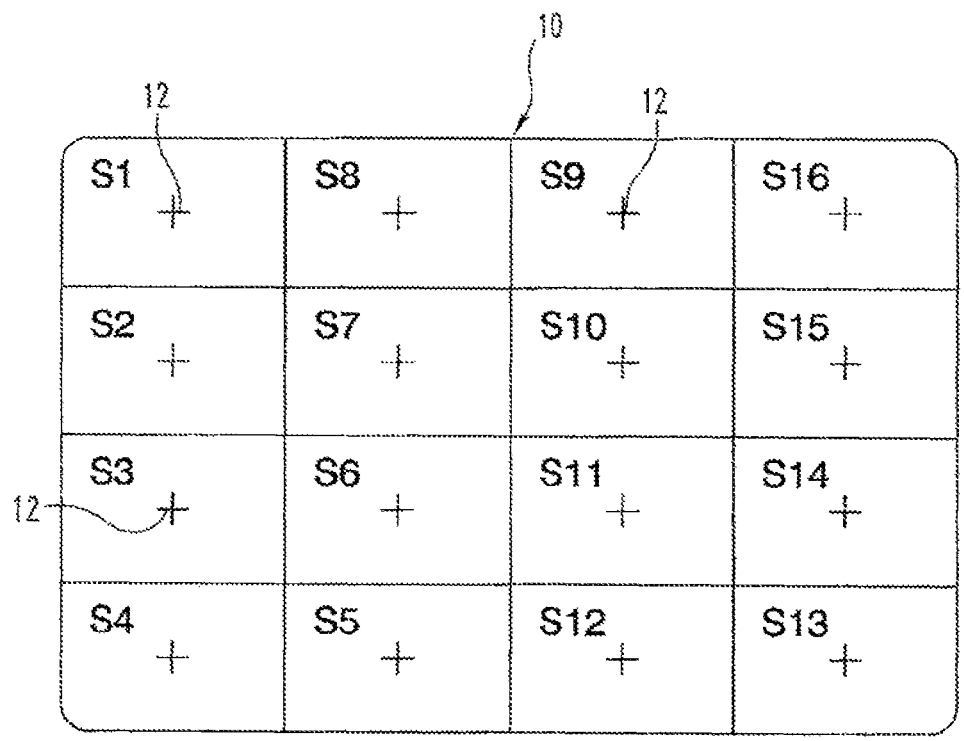
FIG. 1 illustrates a field that has been divided up into a plurality of sample cells.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices, and such further applications of the principles of the invention as illustrated herein are contemplated as would normally occur to one skilled in the art to which the invention relates.

Referring to FIG. 1, a field 10 is illustrated that has been divided up into a grid-like pattern that includes a plurality of sample cells S1-S16. For illustrative purposes only, the field 10 illustrated in FIG. 1 could be representative of a thirty-two (32) acre field that has been divided up into sixteen (16) sample cells S1-S16. As such, in this illustrative example, each sample cell S1-S16 represents approximately two (2) acres of land. Although the sample cells S1-S16 are illustrated as having a generally rectangular shape, it should be appreciated that the size and shape of the sample cells S1-S16 for a given field can vary depending on the size and shape of the field 10 and so on. In addition, the field 10 could be divided up into other patterns other than a grid-like pattern in other forms of the present invention.

As further illustrated in FIG. 1, in order to determine the nutrient level of the soil at any given location in the field 10, a plurality of core soil samples 12 must be taken from various locations in the field 10. In this representative form, a core soil sample 12 is taken from within each sample cell S1-S16. Although the core soil samples 12 are illustrated as being taken in a regular systematic grid-like pattern, it should be appreciated that the core soil samples 12 can be taken from the field 10 in other ways as well. For example, the core soil samples 12 could be taken in a staggered start pattern, a random pattern, a systematic unaligned grid pattern, and so forth.

Figure 2:
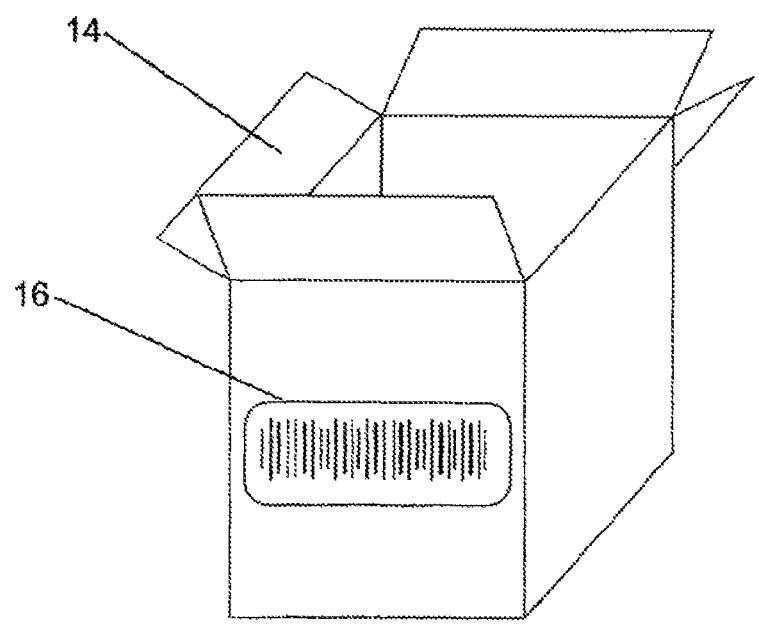
FIG. 2 illustrates a container having a unique machine readable identifier associated therewith.

Referring to FIG. 2, once the core soil samples 12 are taken from the desired location in the field 10, each individual core soil sample 12 is placed into a unique soil sample container 14. As will be discussed in greater detail below, each container 14 has a unique machine readable identifier 16 (e.g.—barcode) associated with it so that each container 14 can be readily identified. Although illustrated as a box in FIG. 2, it should be appreciated that the containers 14 can come in any form suitable for temporarily storing soil samples for laboratory testing such as, for example, bags, bottles, and so forth.

Figure 3:
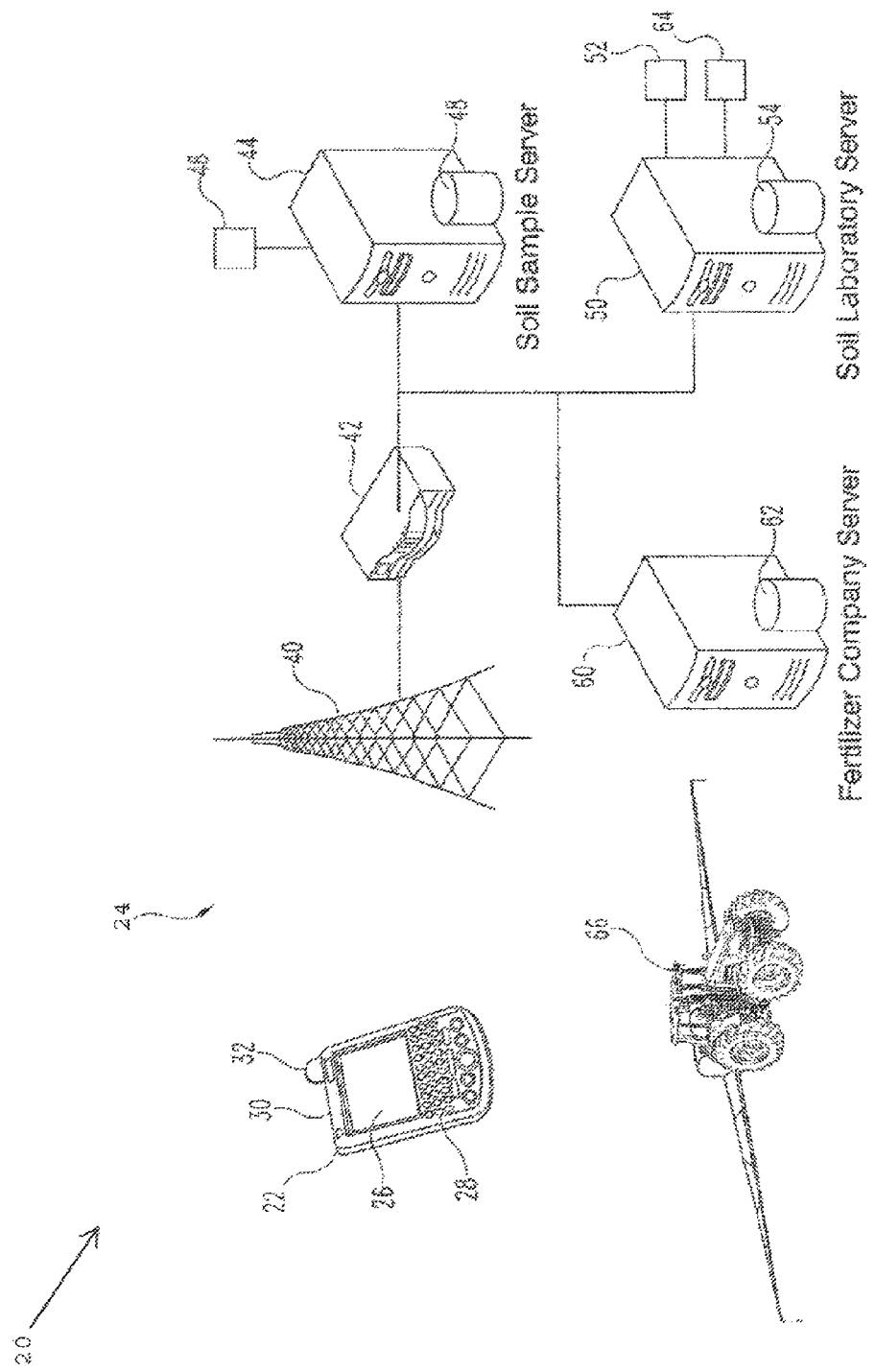
FIG. 3 illustrates a soil analysis system according to one aspect of the present invention.

Referring to FIG. 3, the present invention discloses a system 20 for acquiring soil samples from an agricultural field 10 for analysis and for providing a nutrient prescription for a particular field 10 for use by a fertilizer company or farm. As illustrated, in one form of the present invention the system 20 includes a handheld or remote wireless terminal 22 that is operable to be connected with a wireless communication network 24. Wireless terminal 22 includes a display 26, a keypad 28, a scanner 30, and a Global Positioning System (GPS) receiver 32. In other forms, the wireless terminal 22 includes a Differential Global Positioning System (DGPS) receiver 32. The GPS or DGPS unit 32 is operable to provide the wireless terminal 22 with accurate readings on the geographic location of the wireless terminal 22. In particular, in one form the wireless terminal 22 is capable of generating a longitude coordinate reading and a latitude coordinate reading that correspond to the geographic location in which a soil sample 12 is taken from the field 10.

The scanner 30 is configured and operational to scan the unique identifier 16 associated with the containers 14 as the soil samples 12 are taken from the field 10. In one form, as a respective soil sample 12 is taken at a location in the field 10, the soil sample 12 is placed in the container 14, the unique identifier 16 on the container 14 is scanned, and then the wireless terminal 22 automatically stores the geographic coordinates associated with the soil sample 12 and associates the soil sample 12 with the unique identifier 16 and the geographic coordinates. This allows the user of the wireless terminal 22 to associate each container 14, and thus each soil sample 12, with a specific geographic location in the field 10. The user is not required to individually label or use written records of any kind in order to store information about each soil sample 12 taken from the field 10.

In one form of the present invention, the system 20 includes a wireless transceiver 40 that is configured to transmit wireless data to the wireless terminal 22 and receive data being transmitted from the wireless terminal 22. The wireless transceiver 40 is connected with a router 42 that routes data to a soil sample server 44 of a soil sampling company. In another form, the soil sample server 44 includes a connection member 46 (e.g.—docking station, USB cable, serial cable, parallel cable, and so forth) that allows the user to connect the wireless terminal 22 with the soil sample server 44 to upload data records. Once connected, the wireless terminal 22 is configured and operational to upload data to the soil sample server 44. As further illustrated, the soil sample server 44 includes a database 48 that is configured to store data. As set forth in greater detail below, this data preferentially includes a plurality of farm identifications, soil sample container identifier information (i.e.—identifiers 16), geographic coordinate information associated with a respective container 14, and soil analysis test results. In other forms, the wireless terminal 22 could communicate directly with a laboratory server 50, a laptop or computer owned by the sampler which could transmit the data to the soil sample server 44 or the laboratory server 50, and so forth.

The system 20 also includes a soil laboratory server 50 that is connected with the soil sample server 44. The soil laboratory server 50 is connected with one or more pieces of soil analysis equipment 52 that are configured to run various tests on the soil samples 12. The soil analysis equipment 52 may test the following attributes of each soil sample 12: the acidity or alkalinity level (pH levels), buffer pH levels (BpH), Cation Exchange Capacity (CEC) levels, potassium levels ($K^+$), sulfur levels ($S^+$), ammonium levels ($NH_4^+$), magnesium levels ($Me^+$), calcium levels ($Ca^{++}$), zinc levels ($Zn^+$), manganese levels ($Mn^{++}$), iron levels ($Fe^{++}$), copper levels ($Cu^+$), hydrogen levels ($H^+$), and so forth. While hydrogen is not a nutrient, it affects the degree of acidity (pH) of the soil, so it is also important. For the purpose of the present invention, it should be appreciated that almost any type of test may be ran on the soil samples 12 to obtain a reading of an attribute of interest. As a result, a plurality of soil sample test results are generated that are stored in a soil analysis database 54 associated with the soil laboratory server 50. In one form, the soil sample test results are transmitted to the soil sample server 48 and in yet another form, the soil sample test results are transmitted to a fertilizer company server 60 connected with the soil laboratory server 50 and the soil sample server 44. The fertilizer company server 60 stores the soil sample test results in a database 62 and the soil sample server 44 also stores the test results in database 48. The fertilizer company server 60 could also be a consulting firm server or a server that is maintained by a farmer or customer.

Figure 4:
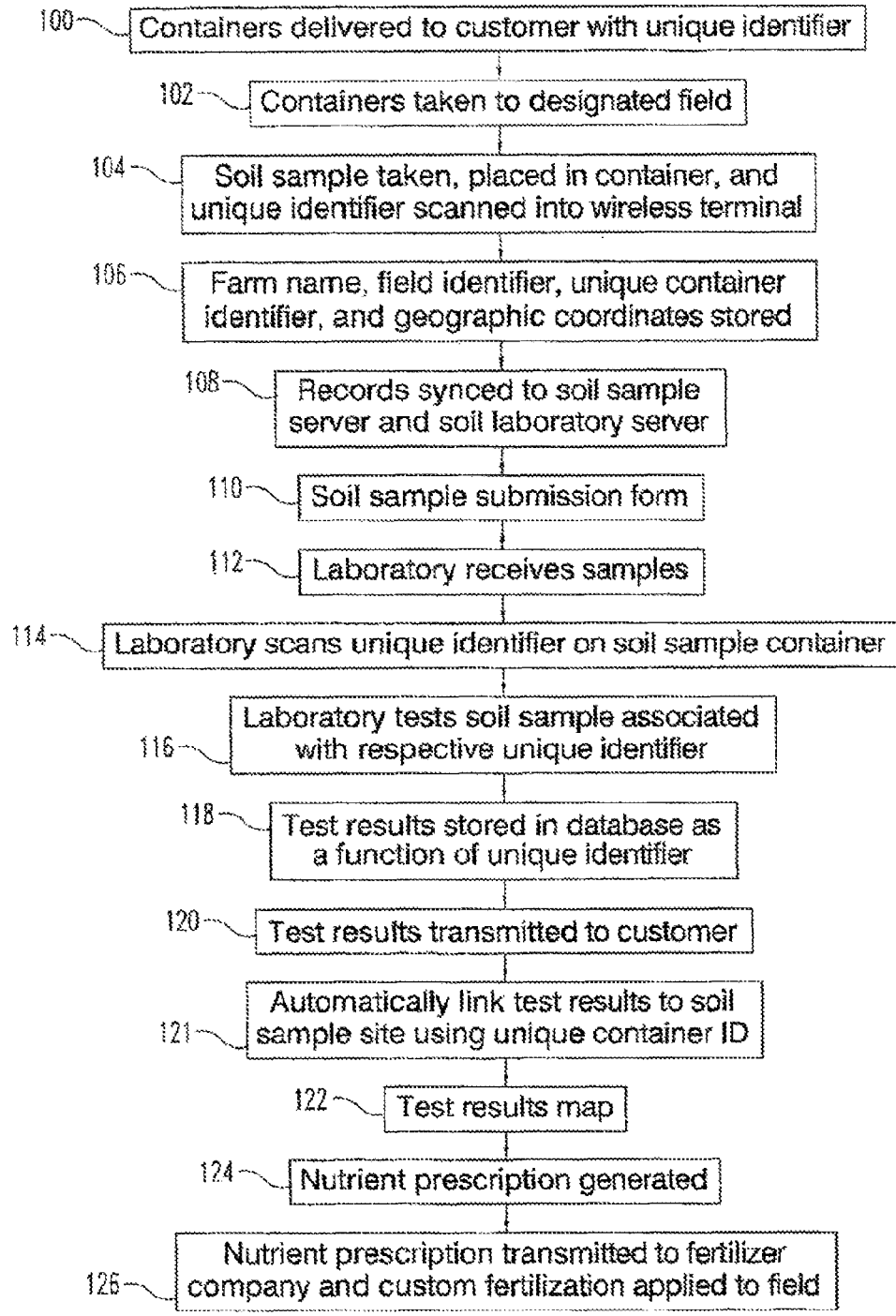
FIG. 4 is a flow chart illustrating certain steps performed in the present system.

Referring to FIG. 4, a more detailed explanation of system 20 will be discussed. At step 100, a plurality of containers 14 are delivered to a sample taker or customer. As set forth above, a unique machine readable identifier 16 is associated with each respective container 14. At step 102, the sample taker takes the containers 14 to a designated field 10 of a client of the sample taker or soil sampling company. At step 104, the sample taker takes a soil sample 12 from the field 10 and places it in the container 14. The sample taker then scans the unique identifier 16 on the container 14 using the scanner 30 on the wireless or remote terminal 22.

Figure 5:
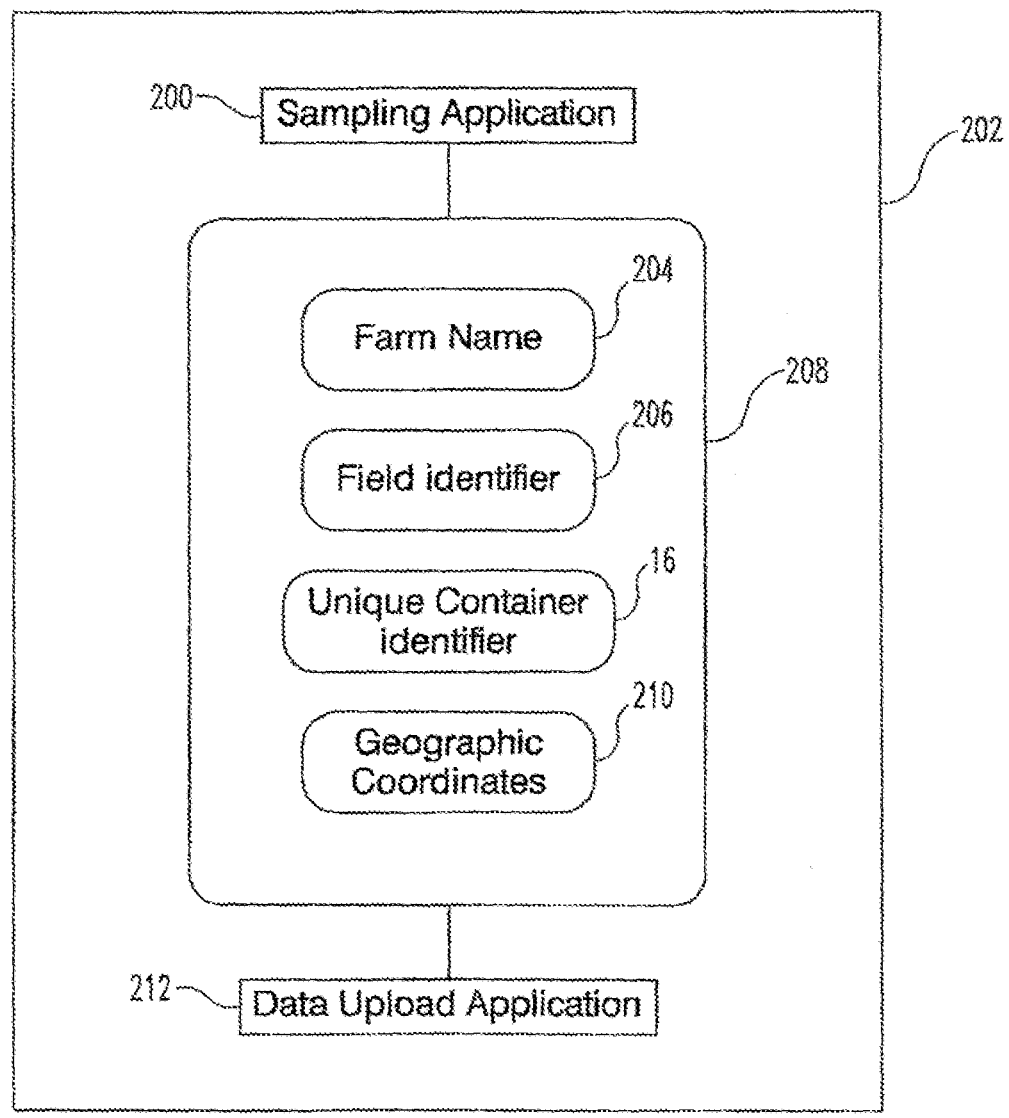
FIG. 5 illustrates certain software applications and databases contained on a wireless terminal associated with the system.

Referring to FIG. 5, the wireless terminal 22 includes a sampling application 200 that is stored in a memory device 202 of the wireless terminal 22. In other forms, the sampling application 200 could wirelessly be provided to the wireless terminal 22 from the soil sample server 44 in the form of a browser based web application or custom application. The sampling application 200 is configured to allow the sample taker to enter a farm/client name 204 and a field identifier 206. The field identifier 206 can be provided by the field owner (e.g.—Smith Field 1) or could be in the form of an address. In the case of an ongoing client, the sampling application 200 is configured to allow the sample taker to pull up a client name 204 and field identifier 206 already stored in a database on the wireless terminal or on database 48 of the soil sample server 44.

The sampling application 200 is also configured to allow the sample taker to scan the unique identifier 16 on the container 14 using the scanner 30 of the wireless terminal 22 as the soil samples 12 are taken from the field 10. As previously set forth, the soil samples 12 can be taken from the field 10 from various sample cells S1-S16. Once the wireless terminal 22 is used to scan the unique identifier 16 on the container 14, a record 254 (see FIG. 6) is automatically generated by the soil sampling application 200 that is stored in the database 208 of the wireless terminal 22 or transmitted to the soil sample server 44 for storage in database 48, which is represented at step 106 in FIG. 4. In one form, the record 254 includes the farm/client name 204, the field identifier 206, the unique container identifier 16, and a geographic coordinate reading 210. See FIG. 5. As such, each record 254 is associated with a respective container 14 via the unique identifier 16 on each of the containers 14.

Referring collectively to FIGS. 4 and 5, at some point in time, after all of the soil samples 12 have been taken from cells S1-S16 in the field 10, in one form of the present invention, the records 254 generated by the sample taker using the wireless terminal 22 in the field 10 are uploaded or synced with the soil sample server 44, which is represented at step 108. In other forms, the records 254 created by the sampling application 200 can automatically be transmitted to the soil sampling server 44 and stored in database 48 as the records 254 are generated by the soil sampling application 200. In yet another form, the wireless terminal 200 can be connected with the soil sampling server 44 with the connection member 46 and then the records 254 can be uploaded to the soil sampling server 44. The wireless terminal 22 includes a data upload application 212 that is configured to control how records 254 are transmitted to the soil sample server 44. All records 254 generated are stored in the database 48 associated with the soil sample server 44. In the illustrated example, sixteen (16) records would be generated and transmitted to the soil sampling server 44 for the field 10. This represents one record 254 for each sample cell S1-S16.

Referring to FIG. 4, at step 108 the records 254 could also have been synced or uploaded to the soil laboratory server 50. In some forms, the operator of the soil sample server 44 may not actually perform the soil analysis. As such, the records 254 generated by the soil sampling application 200 will need to be provided to the lab actually performing the soil analysis. In other forms, the owner of the soil sampling server 44 may actually perform the soil analysis, thereby eliminating the need for providing the records to 254 the soil laboratory server 50. In this form, the soil analysis equipment 52 would be connected or associated with soil sample server 44.

The sample taker may generate a soil sample submission form 110. The soil sample submission form 110 can be generated automatically by the soil sampling application 200 after the soil samples 12 have all been collected or manually generated by the soil sampler. The soil sample submission form 110 is used for shipment or transport of the soil samples 12 to the laboratory for analysis. At step 112, the laboratory responsible for testing the soil samples 12 (either the owner of soil sample server 44 or a third party laboratory responsible for soil laboratory server 50) receives the soil samples 12. For the sake of brevity, during the remainder of this detailed description it will be assumed that a third party laboratory is responsible for testing the soil samples. However, it should be appreciated that the soil analysis may be performed at the same location to which the records 254 are originally reported (i.e.—the soil sample server 44).

Figure 6:
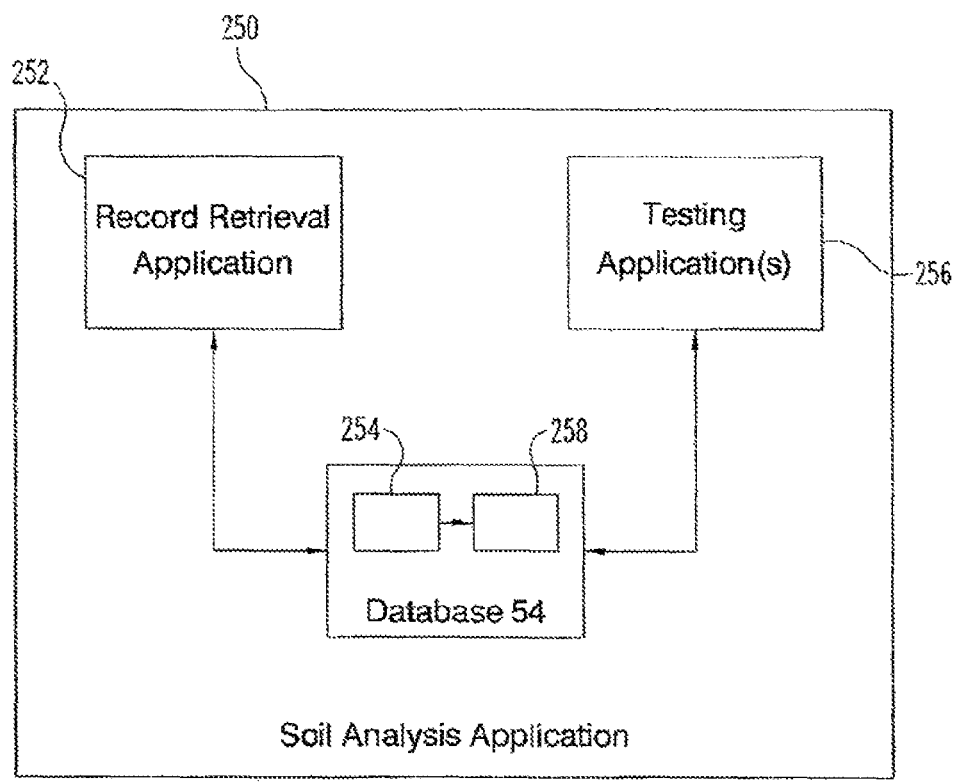
FIG. 6 illustrates a representative soil analysis application.

Referring to FIGS. 3, 4, and 6, once the soil samples 12 reach the lab, a scanner 64 connected or associated with the soil laboratory server 50 is used to scan the unique identifier 16 of each container 14 as each soil sample is analyzed, which is represented at step 114. The soil laboratory server 50 includes a soil analysis application 250 that is configured and operable to generate test results that are associated with the soil samples 12. The soil analysis application 250 includes a record retrieval application 252 that is configured and operable to interpret the unique identifier 16 of each soil sample 12 received and retrieve a respective record 254 associated with the unique identifier 16 from the database 54. Based on the scanned unique identifier 16, the soil analysis application 250 is capable of determining the farm/ client name 204 associated with that particular soil sample 12, the field identifier 206 associated with that particular soil sample 12, and the geographic coordinates 210 associated with that particular soil sample 12.

At step 116, the lab performs tests on the soil sample 12 and generates a plurality of test results 258 associated with the soil sample 12. One or more soil testing applications 256 may be associated with the soil laboratory server 50 for generating the test results 258. As illustrated in FIG. 6, in one form the testing application 256 is configured to generate test results 258 that are associated with each respective record 254. As a result, the test results 258 are associated with a particular farm/client name 204, field identifier 206, unique container identifier 16, and geographic coordinates 210. In one form, the test results 258 are stored in database 54 as a function of the unique identifier 16 associated with the soil sample 12, which is represented at step 118.

Figure 7:
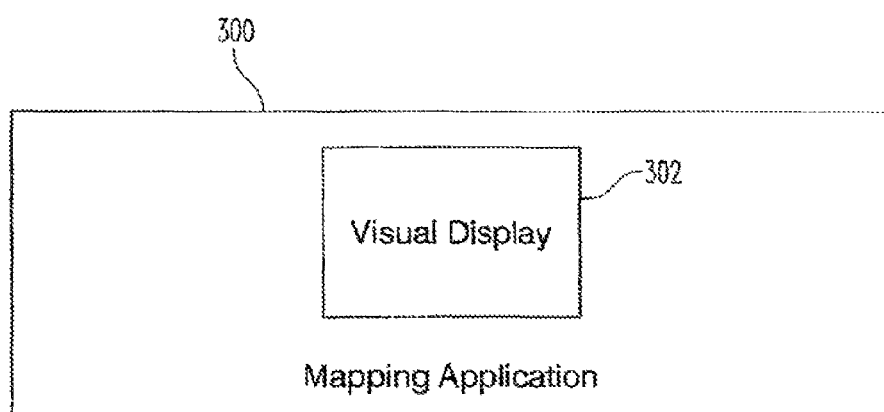
FIG. 7 illustrates a representative mapping application.

In case the soil analysis is done by a third party lab specializing in performing soil tests, the records 254 and test results 258 may then be transmitted to the soil sample server 44 and stored in database 48, which is represented at step 120. At step 121, the test results 258 are automatically linked to the soil sample site or field 10 using the unique container identification 16. Once the test results are received for an entire field 10, one or more test result maps 122 can be generated using a mapping application 300 (see FIG. 7). The mapping application 300 is configured to generate one or more visual displays 302 of the field 10 and place the test results 258 for each specific geographic location of the field 10 on the visual display 302. The visual displays 302 are generated using images of the field 10 obtained from other databases. These images could either be in the form of real photographs or maps. The mapping application 300 uses the geographic coordinates 210 associated with each record 254 to place the test results on the visual displays 302. In one form, the visual displays 302 can be transmitted to the client in the form of an executable file that can be viewed on a computer. In yet another form, the visual displays 302 can be transmitted to the client in the form of a digital file, such as a portable document file (PDF). In other forms, the visual displays 302 can be printed in a traditional paper format and provided to the client.

Figure 8:
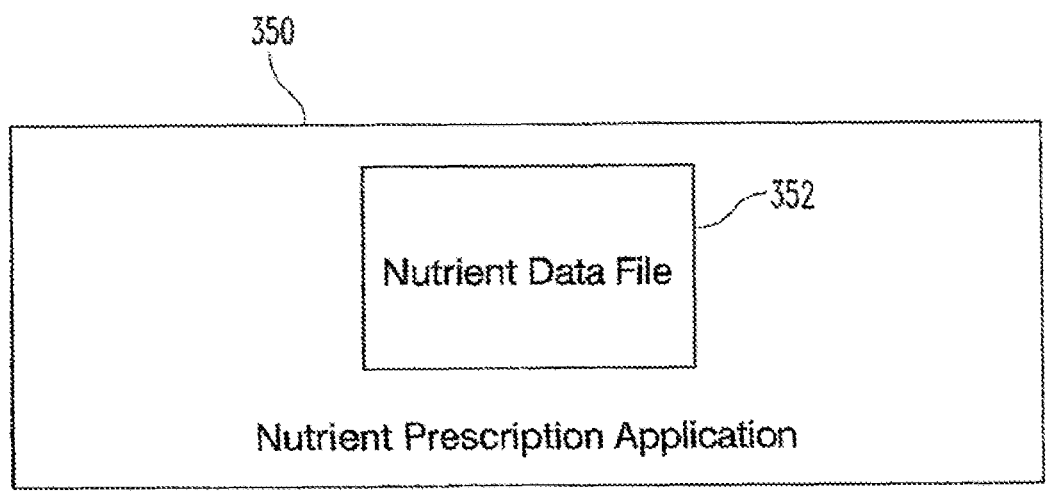
FIG. 8 illustrates a representative nutrient prescription application.
Figure 9:
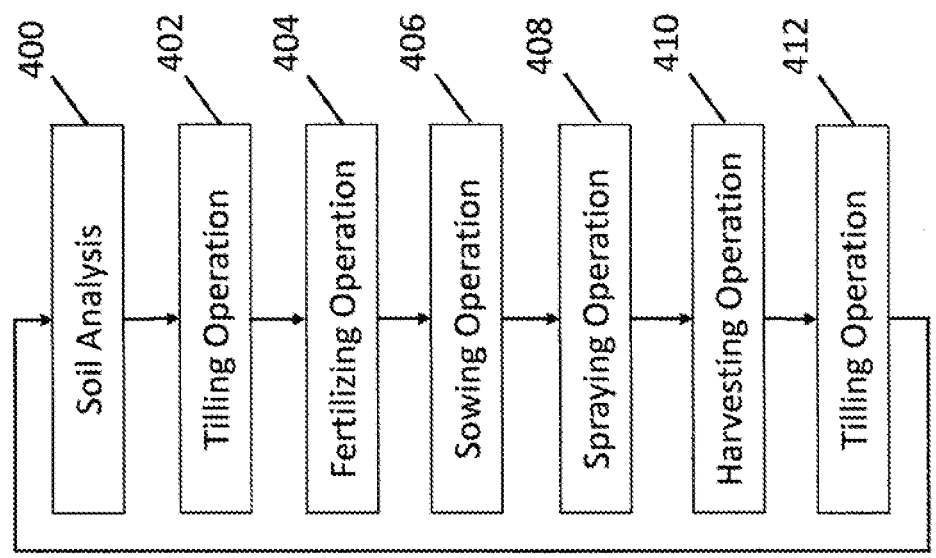
FIG. 9 illustrates a representative example of a farming process for a field.

Referring to FIGS. 3, 4, and 8, in yet another form of the present invention the system 20 includes a nutrient prescription application 350. The nutrient prescription application 310 is operable and configured to generate a nutrient data file 312 associated with a respective field 10. The nutrient prescription application 350 generates the nutrient data file 352 as a function of the records 254 and test results 258. The nutrient data file 352 contains data values associated with what level of nutrients need to be added to respective areas of the field 10 based on the test results 258. As such, the level of nutrients (e.g.—fertilizer) applied to one area of the field 10 will be different than in other areas of the field 10. This is because the soil samples 12 were associated with the unique identifier 16, which in turn allowed the soil samples 12 to be associated with respective geographic coordinates 210 of the field 10. Different cells S1-S16 of the field 10 will need different levels of nutrients for a variety of reasons. As such, the nutrient prescription application 350 allows for very specific application of nutrients to different areas of the field 10 instead of a one application fits all type of approach.

In one form, the nutrient data file 352 is transmitted to the fertilizer company server 60, which is represented at step 126 in FIG. 4. In yet another form, the nutrient prescription application 350 is located on the fertilizer company server 60. The nutrient data file 352 is then uploaded to a nutrient applicator 66 that is configured to provide nutrients to the field 10. The nutrient applicator 66 uses the nutrient data file 352 to apply nutrients to the field 10 at the levels they are needed in respective areas of the field 10 as a function of the nutrient data file 352. As such, nutrients are applied at optimum levels in the field 10 by the nutrient applicator 66 thereby avoiding either over or under application of nutrients in specific areas or cells S1-13 of the field 10.

Referring to FIGS. 1-3 and 9, in yet another form of the present invention, a system 500 is disclosed that can be integrated with the systems and methods disclosed above with respect to FIGS. 1-8. During the course of any given farming cycle of a field 10 used to produce crops, several different types of farming operations may occur in the field 10. The farming operations or steps disclosed herein should be viewed as illustrative only and not as an exhaustive list of farming operations. Several other different steps or operations may be used or required to produce certain crops not disclosed herein. However, it would be appreciated by those skilled in the art that the discussion below would be applicable to producing almost any crop using precision farming. Further, it should be appreciated that certain steps may be omitted or not listed in this example.

As illustrated at step 400, a soil analysis is conducted in the field 10 using the soil sampling system and method disclosed herein. At step 402, a tilling operation is conducted in the field 10 that prepares the field 10 to be planted. As known in the art, tilling is the agriculture preparation of soil by mechanical agitation of various types, such as digging, stirring, and overturning. At step 404, a fertilizing operation is conducted in the field 10 using the fertilizer subscription created by the nutrient prescription application 350 (See FIG. 8).

At step 406, a sowing operation is conducted in the field 10 that is the actual process of planting seeds in the field 10. After the sowing operation 406, at step 408, a spraying operation may be conducted in the field 10. Typically, the spraying operation 408 consists of the application of fertilizer, herbicides, pesticides, and fungicides to plants growing in the field 10 by spraying the chemicals on the plants. A harvesting operation 410 may then be conducted which is the actual process of gathering mature crops from the field 10. At step 412, a second tilling operation might be conducted to prepare the field 10 to begin the process again at step 400.

Figure 10:
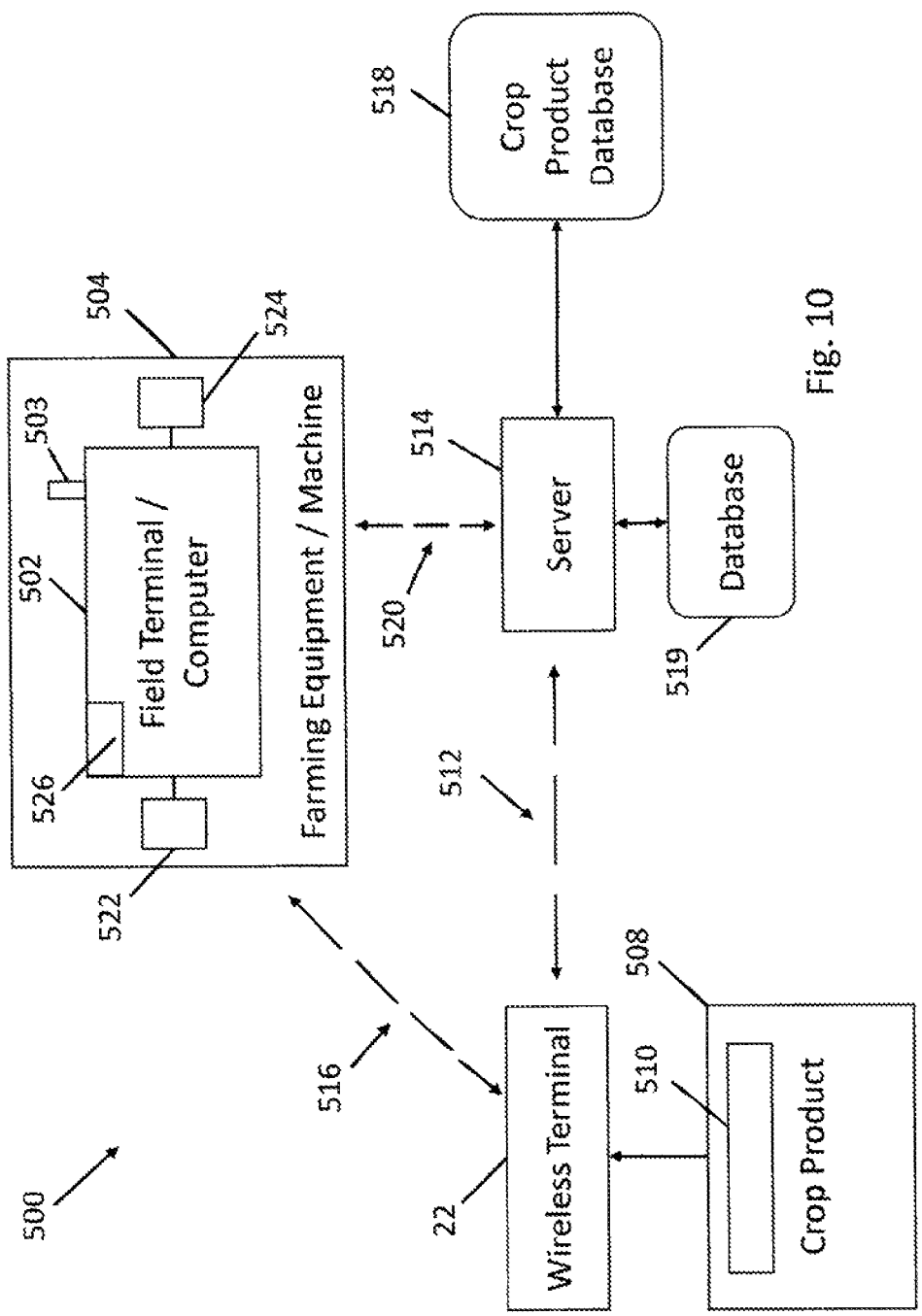
FIG. 10 illustrates a system for precision farming.
Figure 11:
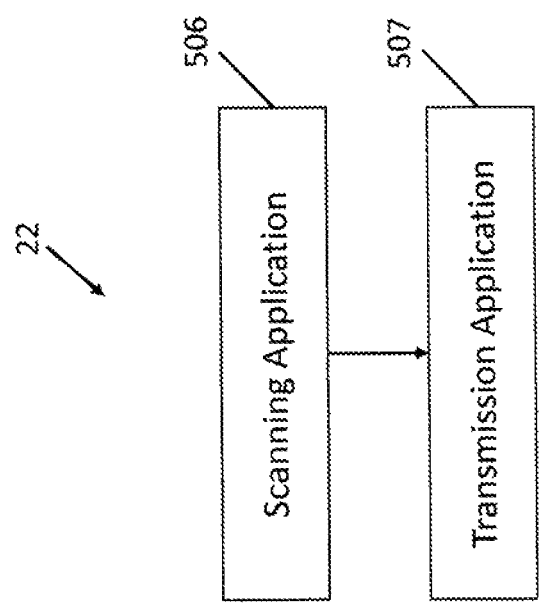
FIG. 11 illustrates software modules utilized on a remote terminal of the system for precision farming.

Referring to FIGS. 10 and 11, a system 500 is disclosed that is configured for use in precision farming. The system 200 includes a wireless terminal 22 (see FIG. 3) and a field terminal or computer 202 that is associated with a piece of farm equipment 504. The field terminal 502 may be an integral part of the piece of farm equipment 504 or may be in the form of a tablet, laptop, or laptop like device that allows the user to transfer it from farming machine to farming machine. The field terminal 502 includes a wireless communication device 503 that allows it to communicate over various types of wireless networks and with other wireless devices such as the wireless terminal 22. The wireless terminal 22 can be a wireless terminal similar to that described with respect to that disclosed in FIG. 3 and as such, a detailed discussion of the wireless terminal 22 is not needed.

The wireless terminal 22 is configured with a scanning application 506. The scanning application is configured to scan a unique machine readable identifier (e.g. barcode, label, etc.) 510 that is associated with a crop product 508. It should be appreciated that the unique machine readable identifier 510 may be the same for the same type of crop product 508. As used herein, the term crop product 508 means, but is not limited to, seed, fertilizer, insecticide, pesticide, herbicide, and fungicide products. As known to those skilled in the art, each of these products comes in a container (e.g.—bags, buckets, containers, and so forth) that include unique machine readable identifiers 510 such as barcodes. The scanning application 506 uses the scanner 30 of the wireless terminal 22 to scan the unique machine readable identifier 510.

Referring to FIGS. 3 and 11, the scanning application 506 is configured to allow the user to enter a field name 204 and a field identifier 206 associated with the field 10. Further, in other forms, the scanning application 506 can be configured to also transmit a geographic coordinate reading of the wireless terminal 22 along with the unique machine readable identifier 510 and the server 514 can use the lookup application 550 to determine what field 10 is being prepared for a farming operation based on the geographic coordinate reading.

Once the unique machine readable identifier 510 is scanned by the wireless terminal 22, a transmission application 507 located on the wireless terminal 22 is configured to cause the wireless terminal 22 to generate and transmit a product identifier (e.g.—unique code or series of numbers translated from the bar code) associated with the unique machine readable identifier 510 over a wireless network 512 to a server 514. In another form, the remote terminal 22 can store the machine readable identifier 510 in a database on the remote terminal 22 together with a geographic coordinate reading where the scanning operation took place. The remote terminal 22 could then be taken back to a location and the connection member 46 could be used to upload data into a server 514 or a wireless network could be used to upload data into the server 514.

In addition to the product identifier, the transmission application 507 of the wireless terminal 22 is configured to transmit the geographic coordinates of the wireless terminal 22 to the server 514. Further, the transmission application 507 could also be configured to transmit the farm name 204 and the field identifier 206 to the server 514 that identifies the field 10 that is currently undergoing a farming operation. In another form, the wireless terminal 22 may transmit the product identifier obtained from the unique machine readable identifier 510 over a wireless network 516 to the field terminal 502. In this form, a wireless network connection is established between the wireless terminal 22 and the field terminal 502. The field terminal 502 will then transmit the product identifier to the server 514.

Figure 12:
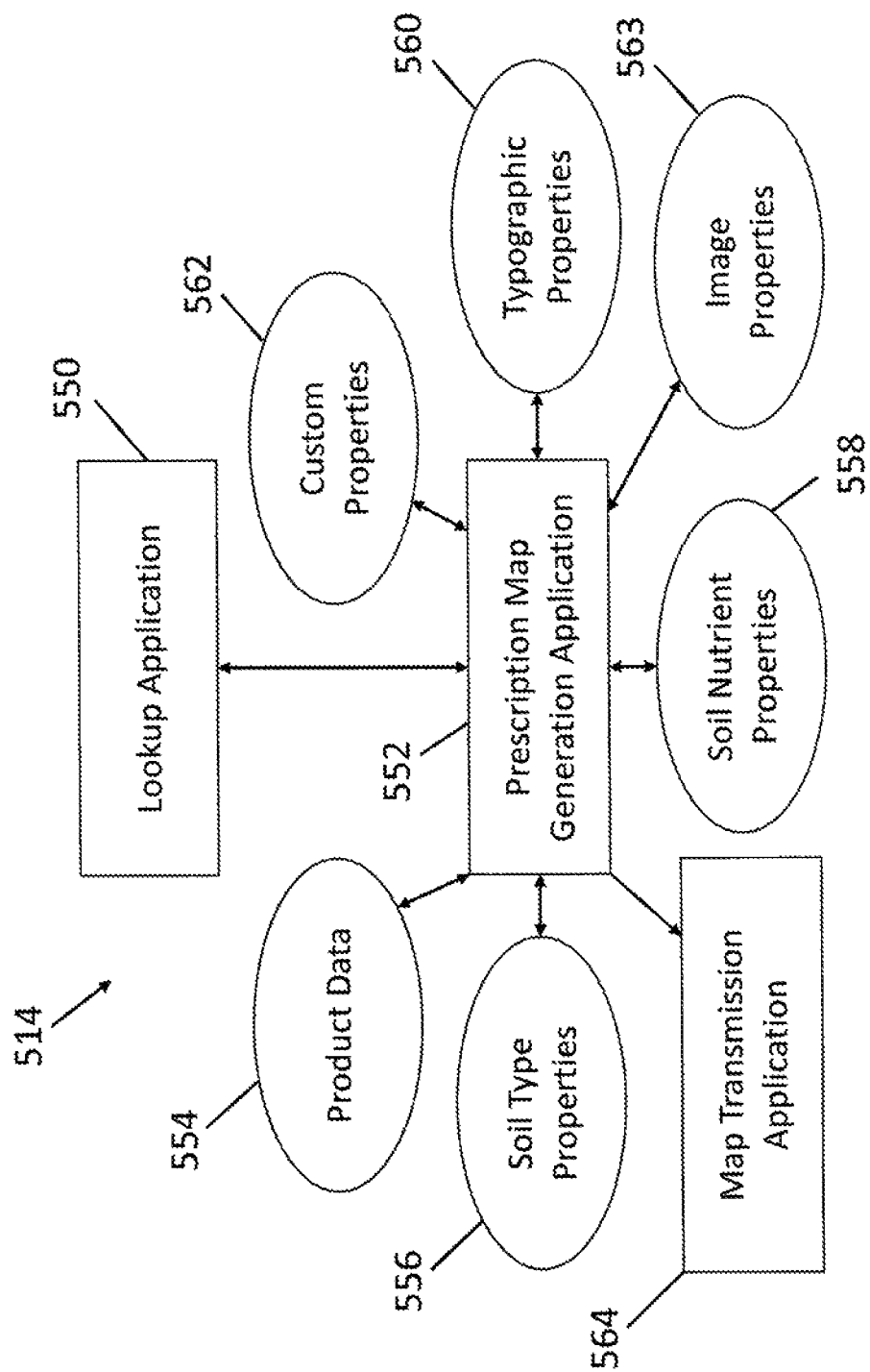
FIG. 12 illustrates applications and data sources utilized by the system for precision farming.

Referring to FIGS. 10 and 12, the product identifier obtained from the unique machine readable identifier 510 will vary depending on whether it is associated with seed, fertilizer, insecticide, pesticide, or fungicide. The server 514 includes a lookup application 550 that is configured to query a crop product database 518 to obtain product data properties 554 associated with the crop product 508 as a function of the product identifier obtained from the unique machine readable identifier 510. For example, for seed the product data may include the company that manufactured the seed, the hybrid of the seed, the crop code (USDA driven), the lot number of the seed, and so forth. The crop product data properties 554 contain data about the crop product 508 specific to the types of acceptable uses, restrictions, recommended application rates, and so forth for the crop product 508. The prescription map generation application 552 is configured to use the crop product data properties 554 to develop tailored prescription maps 600 for the field 10. The crop product database 518 includes various type of information specific to the crop product 508. The crop product database 518 may be associated with the server 514 or the crop product database 518 may be a cloud based database that the lookup application 550 is configured to query to obtain the product data associated with the crop product 508.

The server 514 may also include or be connected with a database 519 that includes data associated with a user account, which would include various field data files about the fields 10 associated with the user account. The database 519 may also function as crop database 518 thereby eliminating the need for separate databases. The lookup application 550 can use the field identifier 206 transmitted by the wireless terminal 22 to determine the field 10 where the farming operation is going to take place. In another form, the lookup application 550 could use the geographic coordinates transmitted by the wireless terminal 22 to determine the field 10 where the farming operation is going to take place. As set forth below, this allows a prescription map generation application 552 associated with the server 514 to know what respective field 10 a prescription map is being requested for. The field identifier 254 might be used when the operator is preparing to leave for the field 10 and loading the particular crop product 508 into the farm equipment 504 so that when he/she arrives at the field 10 they are ready to immediately begin the farming operation. the geographic coordinates of the field terminal 502 could be used if the farming equipment 504 is already at the field 10.

Figure 13:
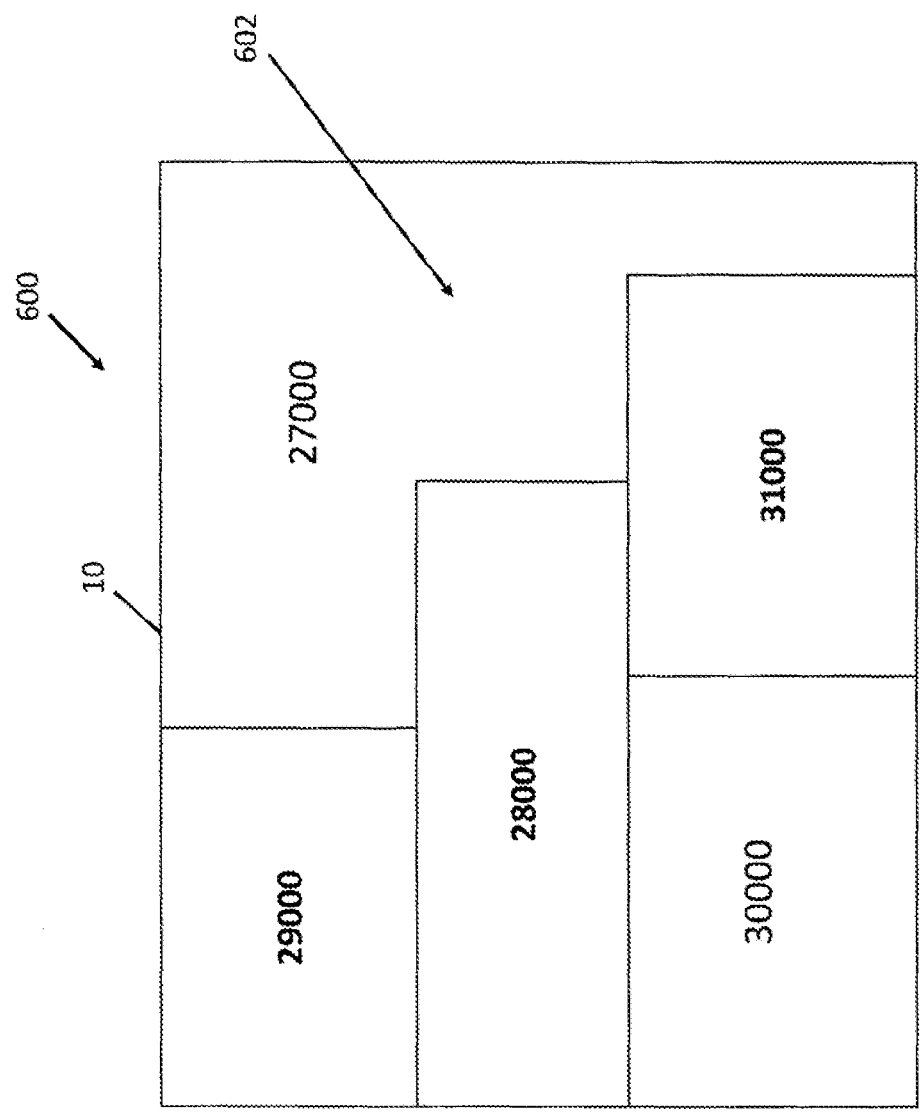
FIG. 13 illustrates a representative field that has had a prescription map generated by the system for precision farming.

As set forth above, the server 514 includes a prescription map generation application 552 that is configured to generate a prescription map 600 (See FIG. 13). With respect to seed, the prescription map generation application 552 may generate the prescription map 600 as a function of, at least in part, the product data properties 554 obtained from the crop product database 518. The prescription map generation application 552 may also generate the prescription map 600 as a function of one or more additional parameters such as, soil type properties 556, soil nutrient properties 558, typographic properties 560, custom properties 562 (e.g.—those defined by the farmer, such as prior year harvest data, and data known by the farmer about a specific field 10), and image properties 563. The image properties 563 may include Normalized Difference Vegetation Index ("NDVI") crop images, thermal crop images, standard high resolution images, and sensor images (e.g.—aerial images, and land based sensor images). In some forms, if set up by the user this way, the prescription map generation application 552 may ignore the product data 554 and generate the prescription map 600 using only one or more of the items set forth above. As such, various factors may be used by the prescription map generation application 552 to generate a respective prescription map 600.

Referring to FIG. 13, an illustrative corn seed prescription map 600 is depicted that has been generated by the prescription map generation application 552 for a respective field 10. As illustrated, the prescription map 600 has generally divided the field 10 up into a plurality of sectors or regions 602. It should be appreciated that this is a simplistic illustration of a respective prescription map 600 as the regions 602 would likely vary drastically all over the field 10 in a more realistic presentation of the prescription map 600. As illustrated, the prescription map 600 includes a plurality of regions 602 in which the prescription map generation application 552 has determined that corn should be planted at 2700 seeds/acre, 28000 seeds/acre, 29000 seeds/acre, 30000 seeds/acre, and 31000 seeds/acre.

Once the prescription map 600 has been generated by the server 514, the server 514 includes a map transmission application 564 that is configured to transmit the prescription map 600 over a wireless communication network 520 to the field terminal 502. The prescription map 600 includes application rate data and geographic coordinates associated with the application rate data so that the field terminal 502 knows how to control the farming equipment 504 in the respective regions 602. It should be appreciated that the wireless communication networks 512, 516, 520 disclosed herein could be provided by a single wireless network provided by a service provider such as Sprint, AT&T, or Verizon and that the wireless communication networks would thus constitute a single network. An operator of the farming equipment 504 is now ready to apply the crop product 508 (e.g.—seed, insecticide, pesticide, fertilizer, fungicide) to the field 10. The field terminal 502 is configured to apply the crop product 508 to the field 10 as prescribed in the prescription map 600.

Figure 14:
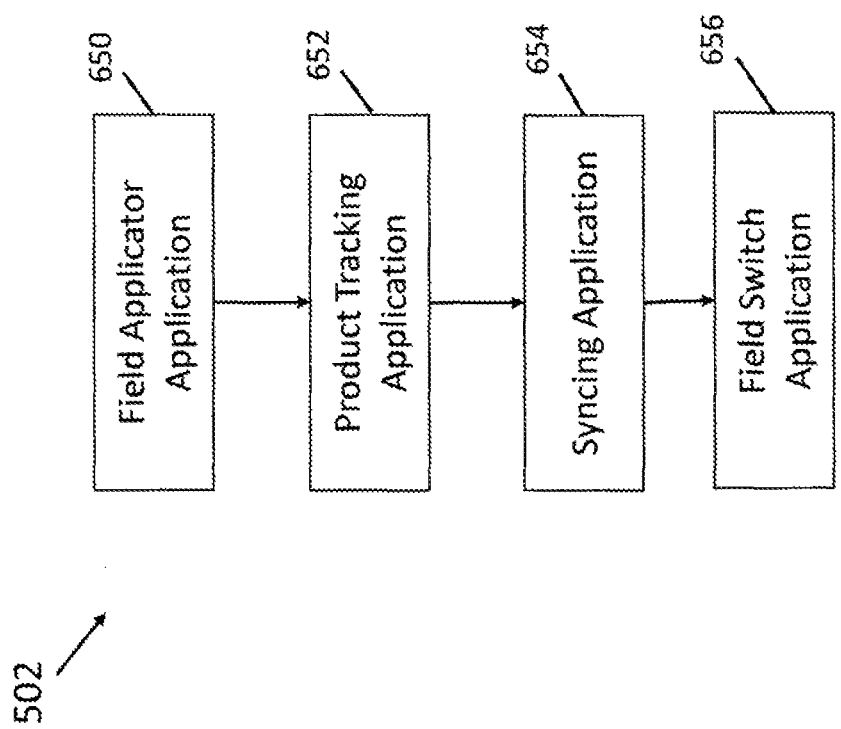
FIG. 14 illustrates software modules utilized by a field terminal.

Referring to FIGS. 10 and 14, the field terminal 502 may include a field applicator application 650. The field applicator application 650 is configured to control the application of the crop product 508 to the field 10 by the farming equipment 504. As used herein, it should be appreciated that the term farming equipment 204 is used in its broadest sense to include numerous types of farming equipment that may be used to apply, harvest or plant crop product 508, such as sprayers, tractors hooked to planters, sprayers, tillers, combines, and so forth. The field terminal 502 is connected with one or more sensors 522 that are configured to keep track of a rate at which the crop product 508 is being applied to the field 10 or planted in the field 10. The field terminal 502 is connected with one or more controllers 524 to control an application rate for the given regions 602 in the field 10 as a function of the application rate data contained in the prescription map 600.

The field terminal 502 includes a product tracking application 652 that keeps track of an amount of crop product 508 that has been applied to the field 10 by the farm equipment 504. In one form, the field terminal 502 includes a Global Positioning System (GPS) receiver 226. In other forms, the wireless terminal 22 includes a Differential Global Positioning System (DGPS) receiver 226. The GPS or DGPS receiver 226 is operable to provide the field terminal 502 with accurate readings on the geographic location of the field terminal 502. In particular, in one form the field terminal 502 is capable of generating a longitude coordinate reading and a latitude coordinate reading that corresponds to a geographic location of the farming equipment 504 in the field 10 as the farming operation for the crop product 508 takes place. The product tracking application 652 is configured to record an amount of crop product 508 applied or planted in the field 10 at every location of the field 10 as recorded by the sensors 522. As such, the product tracking application 652 stores a quantity indication and a geographic coordinate reading (i.e.—"application data") while the crop product 508 is actually being applied to or planted in the field 10.

The field terminal 502 also includes a syncing application 654 that is configured to upload the as-applied data to the server 514. The field terminal 502 uses the wireless network 520 to transmit data back to the server 514. In one form, the syncing application 654 is configured to cause the field terminal 502 to sync data to the server 514 in real-time, when the applicator operating the farm equipment 504 pulls out of the field 10, or at a time designated by the applicator operating the farm equipment 504. As such, all of the applicable application data is synced to the server 514 which in turn stores the application data in the database 519. In another form, the product tracking application 652 may be configured to record the application of crop product 508 to the field 10 without using a prescription map 600.

During operation, if the applicator operating the farming equipment 504 runs out of crop product 508 and has to switch to another crop product 508, the process disclosed herein is started again once the applicator scans the unique machine readable identifier 510 on the crop product 508 as he/she is refilling the farming equipment 504. An updated prescription 600 map is generated that is once against downloaded to the field terminal 502. All other features essentially remain the same as the field terminal 502 will begin causing the farm equipment 506 to apply crop product 508 as prescribed and will record the real-time application rates and geographic coordinates of the application associated with the new crop product 508.

The field terminal 502 may also include a field switch application 656 that allows the applicator operating the farming equipment 504 to switch to another field 10 even though the crop product 508 has not been changed. In other forms, the field switch application 656 will use geo-coordinates obtained by the field terminal 502 to generate another prescription map 600 for the new field 10. The field switch application 656 will cause the system 200 to generate another prescription map 600 for the new field 10 based on the crop product 508 already contained in the farm equipment 504. In alternative forms, the prescription map generation application 552 and associated data stored in the databases 518, 519 may be stored on the field terminal 502 and the field terminal 502 may be configured to perform all of the operations that the server 514 executes during a farming operation. The field terminal 502 may include a transmission application 507 that then uploads the data (either in real time or once the farming operation is complete) to the server 514 so that the relevant data about the farming operation can be stored in the database 519.

As set forth above, the system 200 disclosed herein is equally applicable to the application of fertilizer, herbicide, pesticide and fungicide as it is with seed crop product 508. The applicator would scan a unique machine readable identifier 510 associated with the crop product 508 (e.g.— fertilizer, herbicides, pesticides, and fungicides). The unique machine readable identifier 510 provides a product identifier (e.g.—a unique code or string of numbers) that is transmitted to the server 514. The server 514 then queries the crop product database 518 with the using the lookup application 250 to obtain product data associated with the crop product 508. The crop product database 518 returns back data to the server 514 that is associated with the crop product 508 such as manufacturer, lot number, and production date.

Figure 15:
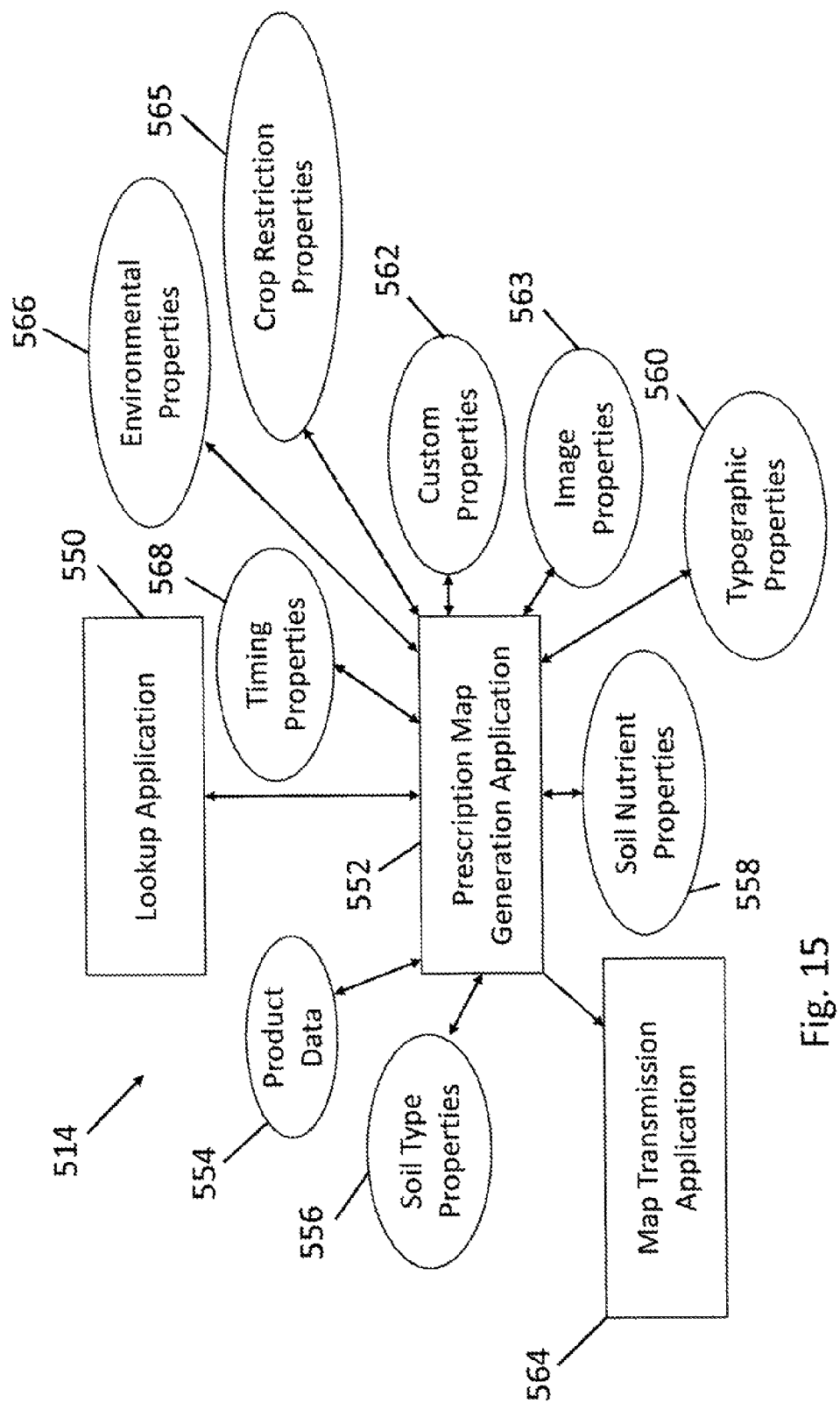
FIG. 15 illustrates applications and data sources utilized by the system for precision farming.

Referring to FIG. 15, the server 514 then uses the prescription map generation application 552 to generate a prescription map 600 as a function of any one or more of the properties 554-568 discussed above. In the case of fertilizers, pesticides, herbicides and fungicides, the prescription map generation application 552 may also use other properties associated with the crop product 508 such as crop restriction properties 565, environmental properties 566, and timing properties 568 to create the prescription map 600.

The crop restriction properties 565 cause the prescription map generation application 552 to determine if the crop product 508 is applicable to a type of plant that has been planted in the field 10 (e.g.—corn, soybean, wheat). If the applicator has loaded a crop product 508 in the farm equipment 504 that is only for soybean, for example, yet is requesting the system 500 to generate a prescription map 600 for a corn field 10, the system 500 will generate a warning message. The environmental properties 566 cause the prescription map generation application 552 to generate a prescription map 600 that will not allow the farming equipment 504 to apply crop product 508 in a prohibited area (e.g.—near bodies of water, open ditches, and so forth). As such, the prescription map 600 will prohibit the farming equipment 504 from applying the crop product 508 in areas where the crop product 508 should not be applied in the field 10. The timing restriction properties 568 causes the prescription map generation application 552 to prohibit the application from generating a prescription map 600 if a predetermined time period has not passed between the application of another crop product 508.

The system 500 disclosed herein provides several advantages over prior art systems and methods of performing farming operations. Scanning the unique identifier 510 associated with the crop product 508 eliminates typing mistakes on data entry or the wrong selection or no selection from a dropdown menu. Application maps 600 do not need to be loaded prior to getting to the field 10. The system 500 looks at the database 519 with parameters/algorithms that determine time sensitive parameters and adjust the application map 600 according to weather, soil test data, soil type data, or any other data sets at the time of application. Application maps 600 have restrictions set such that any environmental issues such as setbacks from waterways, or sensitive areas would be identified automatically and the system 500 would restrict application of the crop product 508 based on the crop product 508 and the farming equipment 504. Correct data would be collected about the application for further refinement of the algorithms/parameters for future applications.

Figure 16:
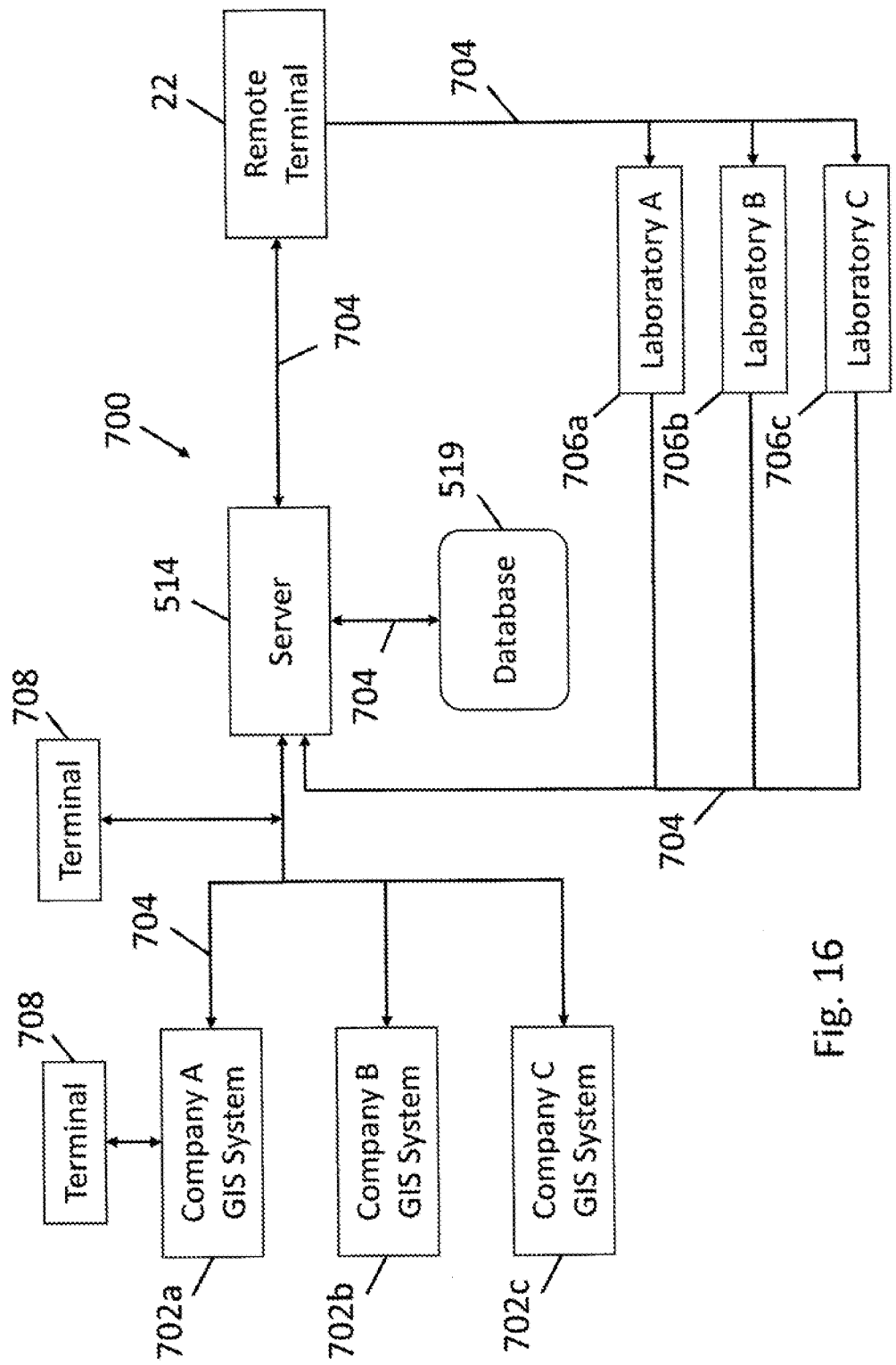
FIG. 16 illustrates a system for precision farming.

Referring to FIG. 16, another system 700 is disclosed that integrates the soil sampling system 20 set forth above into yet another system 700. For the sake of brevity, a detailed description of the sampling process, hardware, and software described above with respect to system 20 will not be repeated and is incorporated herein by reference. The system 700 disclosed herein allows a user of any Geographic Information System ("GIS") software application to send a work order to the system 700, with a given set of requirements, read the work order, and then allow a common field software application to be used to pull and track the samples.

As illustrated in FIG. 16, the system 700 includes one or more company GIS that reside on GIS servers or computers 702a-c that are connected with the soil sampling server 514 via a network 704, such a wireless network or an Internet connection or both. GIS servers 702a-c may belong to companies in charge of farming farms owned by third-parties or farmers and may be referred to herein collectively as "farming companies." As with previous embodiments, the soil sampling server 514 includes a database 519 or is connected with a database 519 via a network connection 704, such as by way of example, a wireless network connection or Internet connection. It should be appreciated that all of the hardware devices disclosed herein could be interconnected with one another via wireless networks or an Internet connection or both. As such, it should be appreciated that network 704 could consist of multiple types of networks that allow the various hardware devices to communicate with one another. As such, unless otherwise specified in the claims, the term network connection should be construed in its broadest sense to include various type of networks that are used to interconnected hardware devices so that they can communicate with one another. In one form, the database 519 is a cloud-based database that may be maintained by a third party. Further, all of the applications disclosed herein utilized by the remote terminal 22 could be web-browser based applications or apps downloaded and installed on the remote terminal 22.

The server 514 is connected with the remote terminal 22 via a network 704 (at least in part comprising a wireless network). As set forth in greater detail below, the remote terminal 22 is connected via the network 704 (at least in part comprising a wireless network) with one or more laboratory servers 706a-c. The laboratory servers 706a-c are connected with the soil sampling server 514 via the network 704. In alternative forms, the soil sampling server 514 may be connected with laboratory servers 706a-c via network 704 such that data may be exchanged.

Figure 17:
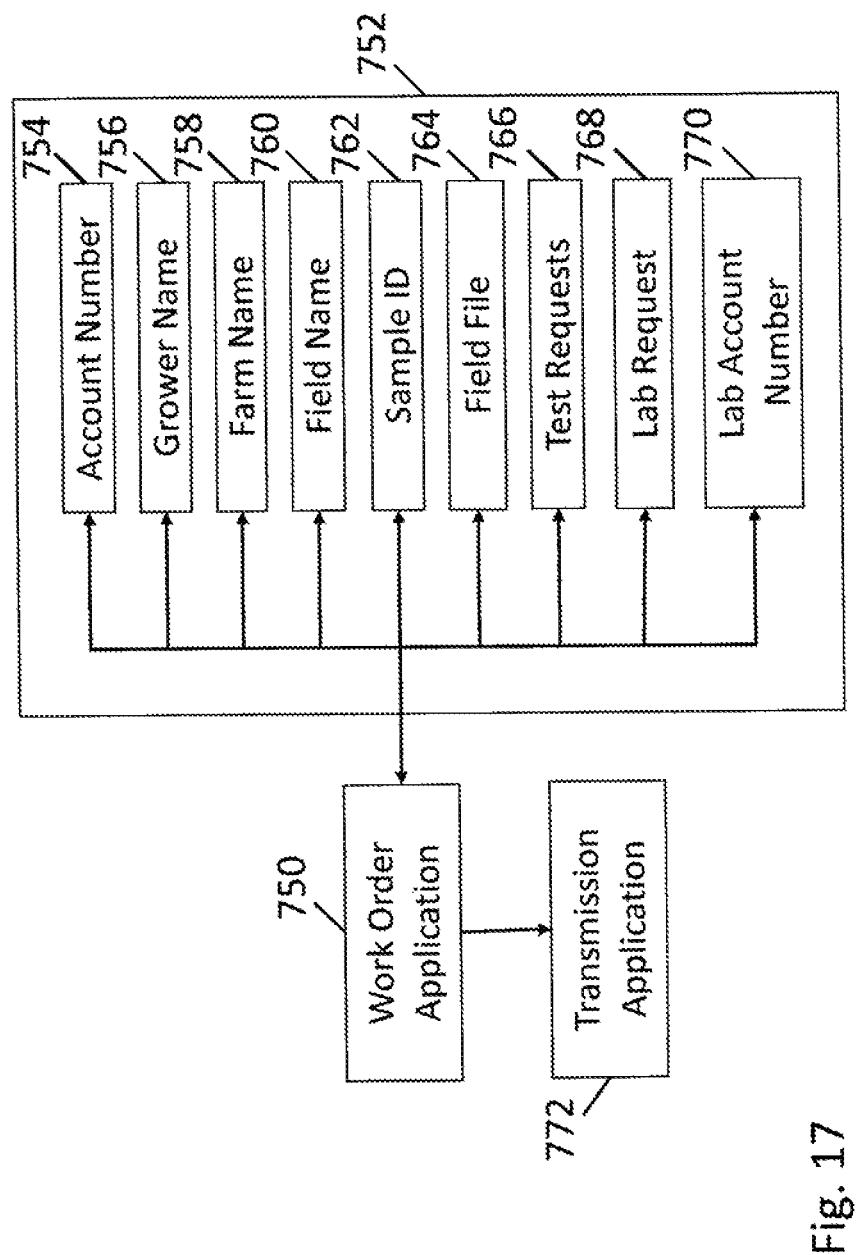
FIG. 17 illustrates applications associated with a farming company.

Referring to FIGS. 16 and 17, the system 700 disclosed herein includes a work order application 750 that is located on or accessible by the farm company servers 702a-c. In other forms, the work order application 750 may be provided to a user on a terminal 708 through a web-browser based interface that is accessible over the Internet 704 from the server 514. In yet another form, the user may gain access to the work order application 750 through a terminal 708 connected with the farm company servers 702a-c. As such, the work order application 750 is accessible through a variety of locations and in some forms may be an application that is downloaded and installed on various types of terminals (e.g.—stand-alone terminal, wireless terminal, networked terminal, and so forth).

The work order application 750 is configured to allow the user to generate a work order that is transmitted to the server 514. Once accessed by the user, the work order application 750 is configured to generate a work order graphical user interface 752 on the terminal 708. The work order graphical user interface 752 allows the user to input data into one or more work order data entry fields, including but not limited to, a company account number 754, a grower name 756, a farm name 758, a field name 760, a sample identification ("ID") 762, a field file 764, one or more test requests 766, a lab request 768, and a lab account number 770. Once the information is entered into the respective fields 754-770, a transmission application 772 is configured to transmit or upload the data entered into the fields 754-770 to the server 514 and then stored in database 519.

The company account number 756 corresponds to an account number that is assigned to a respective farming company using a respective terminal 708 to upload data into the system 700. The account number would be assigned to the farming company by the soil sampling company. In the illustrated form, three companies 702a-c are depicted for illustrative purposes only, but many more companies can be account holders with the owner/operator of server 514. In one form, the owner/operator of server 519 is a soil sampling company. The grower name 756 corresponds to an entity to which subscribes or has contracted with the farming company to provide services for one or more fields 10. The farm name 758 corresponds to the name of a farm that is serviced by the farming company. For example, it is not uncommon for land owners to rent out or hire farming companies to manage all of the farming operations that occur in fields 10 owned by the land owners. The field name 760 correspondence the name of a respective field 10, the address of a respective field 10 or some other unique identifier associated with a respective field 10. For individual farms that use the system 700, the grower name 756 may be left blank or not included in the graphical user interface 752.

The sample ID corresponds to a unique identifier that the farming company 702a-c assigns to a respective sampling operation associated with a work order. The field file 764 allows the farming company 702a-c to upload a file containing geographic data (e.g.—coordinates, boundaries, and so forth) about a respective field 10 for which soil sampling is being requested. In one form, the file is a GIS file that contains geographic data about the field 10. For example, the GIS file could be a Esri shapefile that is compatible with GIS software products. The test requests 766 corresponds to one or more tests that the farming company 702*a-c* would like to be performed on soil samples obtained from the field 10. The lab request 766 corresponds to an identity of a specific lab that the farming company 702*a-c* would like to utilize in order to perform soil analysis of samples taken from the field 10. The lab account number 770 corresponds to the account number that the lab has assigned to the farming company 702*a-c*.

Figure 18:
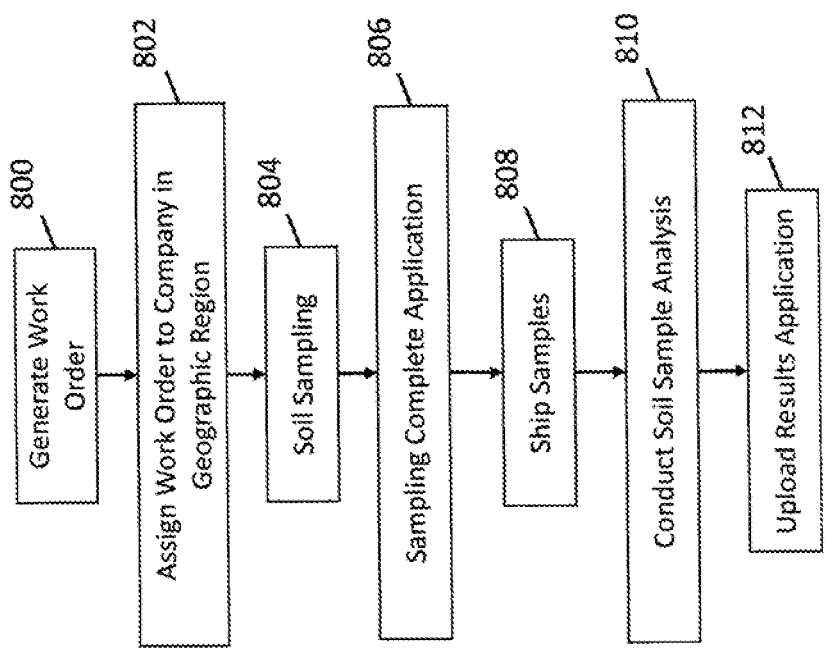
FIG. 18 illustrates representative process steps and applications used to order, obtain, test, and transmit soil sample results.

Referring to FIG. 18, an exemplary embodiment of the steps performed during operation of the system 700 will be set forth in greater detail. At step 800, farming company A 702*a* (for example), generates and transmits a work order to the sampling company server 514 operated by the soil sampling company. At step 802, the sampling company server 514 associates the work order with farming company A 702*a* in its geographic region using the account number 754. At step 804, the soil sampling server 5143 transmits the work order to a soil sampler in the geographic region that will utilize the soil sampling system 20 set forth above with respect to FIGS. 1-9 to obtain soil samples from the field 10. The system 700 allows the soil sampling company to provide soil samples analysis for customers in any geographic region without the need to have a physical presence in each geographic location. The soil sampling company only has to have independent contractors willing to take soil samples in the geographic regions. After the soil samples are obtained, the sample taker utilizes a sampling complete application 806 on the remote terminal 22 to indicate that the sampling process associated with the work order has been completed for the field 10.

At step 808, the sample taker ships the samples taken from the field 10 to the lab responsible for conducting an analysis of the samples. At step 810, the lab conducts the soil sample analysis on the samples by using the process set forth above (i.e.—scanning barcodes on the containers, analyzing soil, storing results). An upload results application 812 on the lab server or computing device 706*a* (in the event lab A is chosen) is configured to upload or transfer the results of the soil sampling analysis to the soil sampling company's server 519. A syncing application 814 on the soil sampling company's server 514 is then configured to sync the data obtained from the soil samples to the database 519 and company A's server or computing device 702*a* for further processing as desired by the farming company. For example, the farming company could use the test results to generate a prescription map 300 for the field 10 by way of a prescription map generation application 552 as disclosed herein. In other forms, the laboratory servers 706*a-c* may be configured to sync the sample results directly to the farming company servers 702*a-c* and the sampling company server 514.

Although various embodiments have been described as having particular features and/or combinations of components, other embodiments are possible having a combination of any features and/or components from any of embodiments as discussed above. As used in this specification, the singular forms "a," "an" and "the" include plural referents unless the context clearly dictates otherwise.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A system comprising:
 a remote terminal connected with a network, wherein said remote terminal includes a scanning application configured to allow said remote terminal to scan a unique product identifier associated with a crop product to be applied to field;
 a server connected with said remote terminal via said network;
 a transmission application associated with said remote terminal configured to transmit said unique product identifier to said server;
 a lookup application associated with said server configured to query, a crop product database to retrieve one or more crop product data properties associated with said crop product;
 a prescription map generation application configured to generate a prescription map for said field as a function of said one or more crop product data properties; and
 a map transmission application configured to transmit said prescription map via said network to a field terminal associated with a piece of farming equipment.

2. The system of claim 1, wherein said transmission application transmits a geographic coordinate reading, associated with said remote terminal to said server.

3. The system of claim 1, wherein said prescription map generation application is configured to generate said prescription map as a function of soil type properties associated with said field.

4. The system of claim 1, wherein said prescription map generation application is configured to generate said prescription map as a function of soil nutrient properties associated with said field.

5. The system of claim 1, wherein said prescription map generation application is configured to generate said prescription map as a function of image properties associated with said field.

6. The system of claim 1, wherein said prescription map generation application is configured to generate said prescription map as a function of typographic properties associated with said field.

7. The system of claim 1, wherein said prescription map generation application is configured to generate said prescription map as a function of custom properties associated with said field.

8. The system of claim 1, wherein said prescription map generation application is configured to generate said prescription map as a function of crop restriction properties associated with said field.

9. The system of claim 1, wherein said prescription map generation application is configured to generate said prescription map as a function of environmental properties associated with said field.

10. The system of claim 1, wherein said prescription map generation application is configured to generate said prescription map as a function of timing properties.

11. The system of claim 1, wherein said field terminal includes a field applicator application configured to apply said crop product to said field as a function of said prescription map.

12. The system of claim 8, wherein said field terminal includes a product tracking application configured to record a plurality of application rates and a plurality of geographic coordinate readings associated with said plurality of application rates as said crop product is applied to said field.

13. The system of claim 9, wherein said field terminal includes a syncing application configured to transmit said plurality of application rates and said plurality of geographic coordinate readings to said server to be stored in a database associated with said server.

14. A method, comprising the steps of:
scanning a unique product identifier associated with a crop product to be applied to a field with a remote terminal;
wirelessly transmitting said unique product identifier to a server over a network;
querying a crop product database to obtain one or more crop product properties associated with said crop product as a function of said unique product identifier;
generating a prescription reap for said field with a prescription map generation application as a function of said one or more crop product properties;
transmitting said prescription map to a field terminal associated with a piece of farming equipment;
utilizing said prescription map to apply said crop product to said field using a piece of farming equipment as a function of said prescription map and recording a plurality of application rates and a plurality of geographic coordinate readings associated with said plurality of application rates with said field terminal as said crop product is applied to said field; and
syncing said plurality of application rates and said geographic coordinate readings associated with said field to a database associated with said server.

15. The method of claim 14, further comprising the step of generating said prescription map as a function of one or more properties selected from a group of properties consisting of one or more soil type properties, one or more soil nutrient properties, one or more image properties, one or more typographic properties, one or more custom properties, one or more crop restriction properties, one or more environmental properties, and one or more timing properties.

16. The method of claim 14, wherein said field terminal includes a field applicator application configured to control an application rate controller associated with said piece of farming equipment.

17. The method of claim 16, wherein said field terminal includes a product tracking application configured to monitor and record said plurality of application rates.

18. A system, comprising:
a wireless remote terminal having a scanner connected with a network;
a server connected with said wireless remote terminal via said network;
a scanning application on said wireless terminal configured to scan a unique product identifier associated with a crop product to be applied to a field;
a prescription map generation application associated with said server that is configured to generate a prescription map for said field as a function of one or more select properties;
a transmission application configured to transmit said prescription map to a field terminal associated with a piece of farming equipment;
a field applicator application associated with said field terminal configured to apply said crop product to said field as a function of said prescription map;
a product tracking application configured to monitor an application rate sensor associated with said piece of farming equipment for recording a plurality of application rates and a plurality of geographic coordinate readings associated with said plurality of application rates as said crop product is applied to said field; and
a syncing application associated with said field terminal configured to transmit said plurality of application rates and said plurality of geographic coordinate readings associated with said plurality of application rates to said server.

19. The system of claim 18, herein said server includes a lookup application configured to query a crop product database to obtain, crop product data properties associated with said crop product identified by said unique product identifier, herein said one or more select properties includes said crop product data properties.

20. The system of claim 18, wherein said one or more select properties can be selected from a group of properties consisting of one or more soil type properties, one or more soil nutrient properties, one or more image properties, one or more typographic properties, one or more custom properties, one or more crop restriction properties, one or more environmental properties, and one or more timing properties.

21. A system, comprising:
a wireless remote terminal having a scanner connected with a network;
a server connected with said wireless remote terminal via said network;
a scanning application on said wireless terminal configured to scan a unique product identifier associated with a crop product the applied to field and a geographic coordinate reading associated with said remote terminal;
a database eon said wireless terminal configured to store said unique product identifier and said geographic coordinate reading; and
a syncing application on, said remote terminal configured to transmit said unique product identifier and said geographic coordinate reading from said remote terminal to at least one hardware device.

* * * * *